(12) United States Patent
Roberts

(10) Patent No.: US 11,986,918 B2
(45) Date of Patent: May 21, 2024

(54) METHOD OF POSITIONING A WORKPIECE ON A MACHINE TOOL

(71) Applicant: THE GLEASON WORKS, Rochester, NY (US)

(72) Inventor: Michael W. Roberts, Rochester, NY (US)

(73) Assignee: THE GLEASON WORKS, Rochester, NY (US)

( * ) Notice: Subject to any disclaimer, the term of this patent is extended or adjusted under 35 U.S.C. 154(b) by 890 days.

(21) Appl. No.: 17/041,523

(22) PCT Filed: Apr. 2, 2019

(86) PCT No.: PCT/US2019/025315
§ 371 (c)(1),
(2) Date: Sep. 25, 2020

(87) PCT Pub. No.: WO2019/195234
PCT Pub. Date: Oct. 10, 2019

(65) Prior Publication Data
US 2021/0008680 A1    Jan. 14, 2021

Related U.S. Application Data

(60) Provisional application No. 62/653,838, filed on Apr. 6, 2018.

(51) Int. Cl.
*B23F 23/04* (2006.01)
*B23F 23/10* (2006.01)
(Continued)

(52) U.S. Cl.
CPC ............ *B23Q 17/003* (2013.01); *B23F 23/10* (2013.01); *B23Q 7/048* (2013.01); *B23Q 17/002* (2013.01);
(Continued)

(58) Field of Classification Search
CPC ................................ Y10T 409/100159; Y10T 409/100795–100954; Y10T 82/2514;
(Continued)

(56) References Cited

U.S. PATENT DOCUMENTS

| | | | | |
|---|---|---|---|---|
| 6,669,415 B2* | 12/2003 | Stadtfeld | ................ | B23F 9/025 409/27 |
| 6,712,566 B2* | 3/2004 | Stadtfeld | ................ | B23F 9/025 409/27 |
| 8,961,081 B2 | 2/2015 | Ronald et al. | | |

FOREIGN PATENT DOCUMENTS

| | | | |
|---|---|---|---|
| CN | 106514411 A | * | 3/2017 |
| EP | 1217479 A2 | | 6/2002 |

(Continued)

OTHER PUBLICATIONS

Machine Translation of JP 61-142041 A, which JP '041 was published Jun. 1986.*

(Continued)

*Primary Examiner* — Erica E Cadugan
(74) *Attorney, Agent, or Firm* — Robert L. McDowell

(57) ABSTRACT

A method wherein by reducing the amount of current, and therefore torque, to the linear servo motor (50) and/or rotary servo motor (52) of a loader mechanism (9), the loader mechanism is operable for determining proper workpiece positioning in a machine tool such as a gear manufacturing machine, particularly a machine (4) for manufacturing bevel and hypoid gears.

11 Claims, 6 Drawing Sheets

(51) Int. Cl.
*B23Q 7/04* (2006.01)
*B23Q 17/00* (2006.01)
*B23Q 17/22* (2006.01)
*G05B 19/18* (2006.01)
*G05B 19/404* (2006.01)

(52) U.S. Cl.
CPC ....... *B23Q 17/2291* (2013.01); *G05B 19/186* (2013.01); *B23F 23/04* (2013.01); *G05B 2219/50362* (2013.01); *Y10T 409/100159* (2015.01); *Y10T 409/100954* (2015.01)

(58) Field of Classification Search
CPC .. G05B 19/186; G05B 19/402; G05B 19/404; B23F 23/04; B23F 23/02; B23B 13/00–13/04; B23Q 7/04–7/048; B23Q 7/1494; B23Q 17/002–17/005; B23Q 17/2291

USPC .......... 409/2, 6–7; 82/124; 414/730, 222.02
See application file for complete search history.

(56) References Cited

FOREIGN PATENT DOCUMENTS

| JP | 61-142041 A | * | 6/1986 |
| JP | 06-000746 A | * | 1/1994 |
| JP | 2014-157462 A | | 8/2014 |

OTHER PUBLICATIONS

Machine Translation of CN 106514411 A, which CN '411 was published Mar. 2017.*
International Search Report and Written Opinion for PCT/US2019/025315, ISA/EPO, May 29, 2019, 11 pgs.

* cited by examiner

METHOD OF POSITIONING A WORKPIECE ON A MACHINE TOOL

FIELD OF THE INVENTION

The invention is directed to machine tools and in particular to loader mechanisms of machine tools and determining workpiece positioning with the loader mechanism.

BACKGROUND OF THE INVENTION

In the machining of workpieces, such as gears including bevel ring gears and pinions, for example, it is common to utilize various "loader" mechanisms to load and/or unload workpieces to and from the machining spindle of a machine tool.

In general, a loader does one of two things, places a workpiece in its gripper onto a machine spindle or uses its gripper to remove a workpiece from a spindle. One such loader mechanism is shown in U.S. Pat. No. 8,961,081, the disclosure of which is hereby incorporated by reference, wherein a pivoting transfer arm with grippers loads workpieces on, removes workpieces from, and transfers workpieces between a workpiece cutter spindle of a machine tool and an auxiliary spindle which may be associated with a secondary apparatus and process, such as chamfering and deburring.

Machine axis positions and loader axis positions for loading and unloading are important for proper functioning of the loader mechanism and well as for proper functioning of the machine tool. Typically, machine axis positions and loader axis positions are determined via a manual setup process involving the machine operator and/or setup personnel.

Gripper jaws, such as 48 and 49 of FIG. 3, have an amount of self-centering and aligning ability. If the jaws grip on a ring gear or pinion blank that isn't centered axially and radially, the jaws inherently create forces that try to center and line up the part in the gripper. If the part is also chucked in a machine tool spindle, for example, this may cause the loader axis to fight against the machine tool axis thereby creating a servo fault.

SUMMARY OF THE INVENTION

The present invention is directed to a method wherein by reducing the amount of current, and therefore torque, to the linear and/or rotary servo motors of a loader mechanism, the loader mechanism is operable for determining proper workpiece positioning in a machine tool such as a gear manufacturing machine, particularly a machine for manufacturing bevel and hypoid gears.

The inventions comprises a method for determining workpiece positioning in a machine tool with the machine tool having a loader mechanism including a means for gripping a workpiece. The loader mechanism is linearly movable along a loader axis by a linear drive means and is angularly movable about the loader axis by a rotary drive means. The linear drive means and the rotary drive means are part of a closed-loop positioning system for the loader axis.

The method comprises applying a first amount of electric current to the linear drive means of the loader and a second amount of electric current to the rotary drive means of the loader with the first amount being reduced in comparison to a defined and/or predetermined full power amount of electric current for the linear drive means and the second amount being reduced in comparison to a defined and/or predetermined full power amount of electric current for the rotary drive means. As a result of the respective reduced electric currents, the linear drive means and the rotary drive means each provide a respective output torque that is reduced in comparison to a defined and/or predetermined full power amount of torque for the respective linear drive means and rotary drive means of the loader.

A workpiece is positioned in a machine spindle and the workpiece is gripped with the means for gripping of the loader mechanism whereby the loader mechanism and the machine spindle are mechanically coupled together. The machine spindle is movable along and/or about one or more axes of motion with each of the axes of spindle motion being associated with a linear drive means and/or a rotary drive means wherein the spindle linear drive means and/or the spindle rotary drive means each outputs a torque at a defined and/or predetermined full power amount. As a result of the reduced output torque of the linear drive means and the rotary drive means of the loader mechanism with respect to the full power output torque of the spindle linear drive means and/or the full power output torque of the spindle rotary drive means, the loader mechanism is repositioned linearly in a direction along the loader axis and rotationally about the loader axis whereby machine forces arising from the mechanical coupling are effectively neutralized.

DETAILED DESCRIPTION OF THE PREFERRED EMBODIMENT

Figure 1:
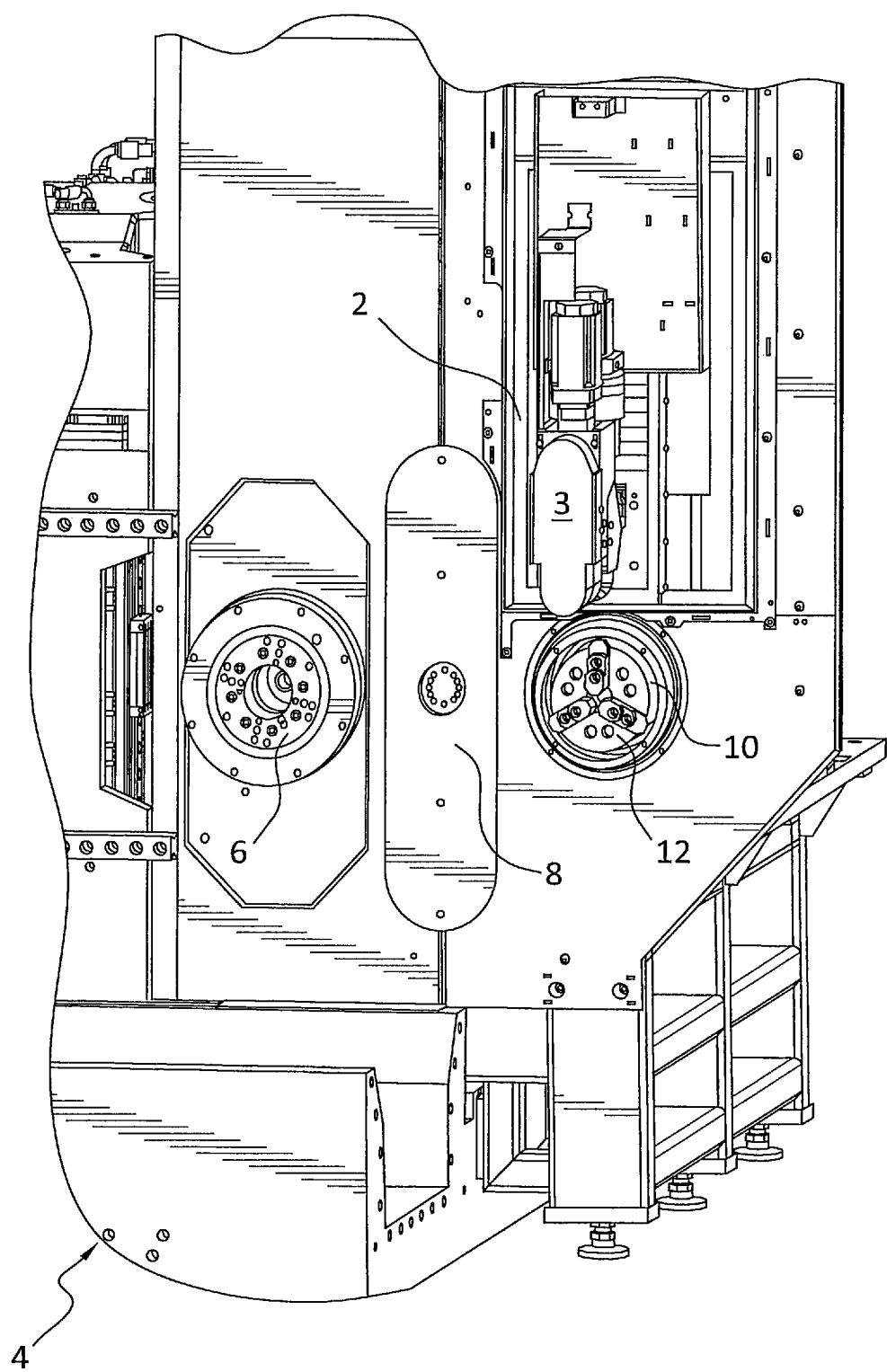
FIG. 1 shows a gear manufacturing machine with a transfer or loader arm in a rest position.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, numbers, letters and/or terms such as "first", "second", "third", etc., are used to herein for purposes of description and are not intended to indicate or imply importance, significance or sequence order unless explicitly stated.

FIG. 1 shows a gear processing machine 4, preferably a multi-axis, computer-controlled gear cutting or grinding machine of the type as disclosed in U.S. Pat. Nos. 6,669,415 and 6,712,566, the disclosures of which are hereby incorporated by reference. For the sake of clarity and ease of viewing, outside sheet metal and some guarding has been omitted. A chamfering and deburring apparatus 2 comprising a tool head 3 is shown positioned near to a workpiece spindle 6 of the gear cutting or grinding machine 4 (discussed hereafter with reference to a gear cutting machine). A pivoting transfer arm 8 transfers workpieces between the workpiece spindle 6 and an auxiliary spindle 10 which may be associated with the chamfering and deburring apparatus 2 although auxiliary spindle 10 may also have utilities apart from chamfering and deburring such as a spin station (after grinding or wet cutting) or a stock dividing station (prior to grinding). A three-jaw chuck 12 for holding a workpiece is shown on spindle 10 but other suitable workholding equipment may be utilized as can be appreciated by the skilled artisan. Workpiece spindle 6 is shown without workholding equipment. However, the skilled artisan will understand that appropriate workholding equipment will be utilized depending upon the geometry of the workpiece being machined.

When loading a workpiece from outside of the machine 4 into auxiliary spindle 10, such as a blank workpiece to be cut, or when unloading a workpiece from machine 4 by removing a machined workpiece from auxiliary spindle 10, such as a deburred and/or chamfered workpiece, the loading and unloading may be carried out manually or via an automated mechanism (e.g. gantry or robotic loading/unloading mechanism).

Figure 2:
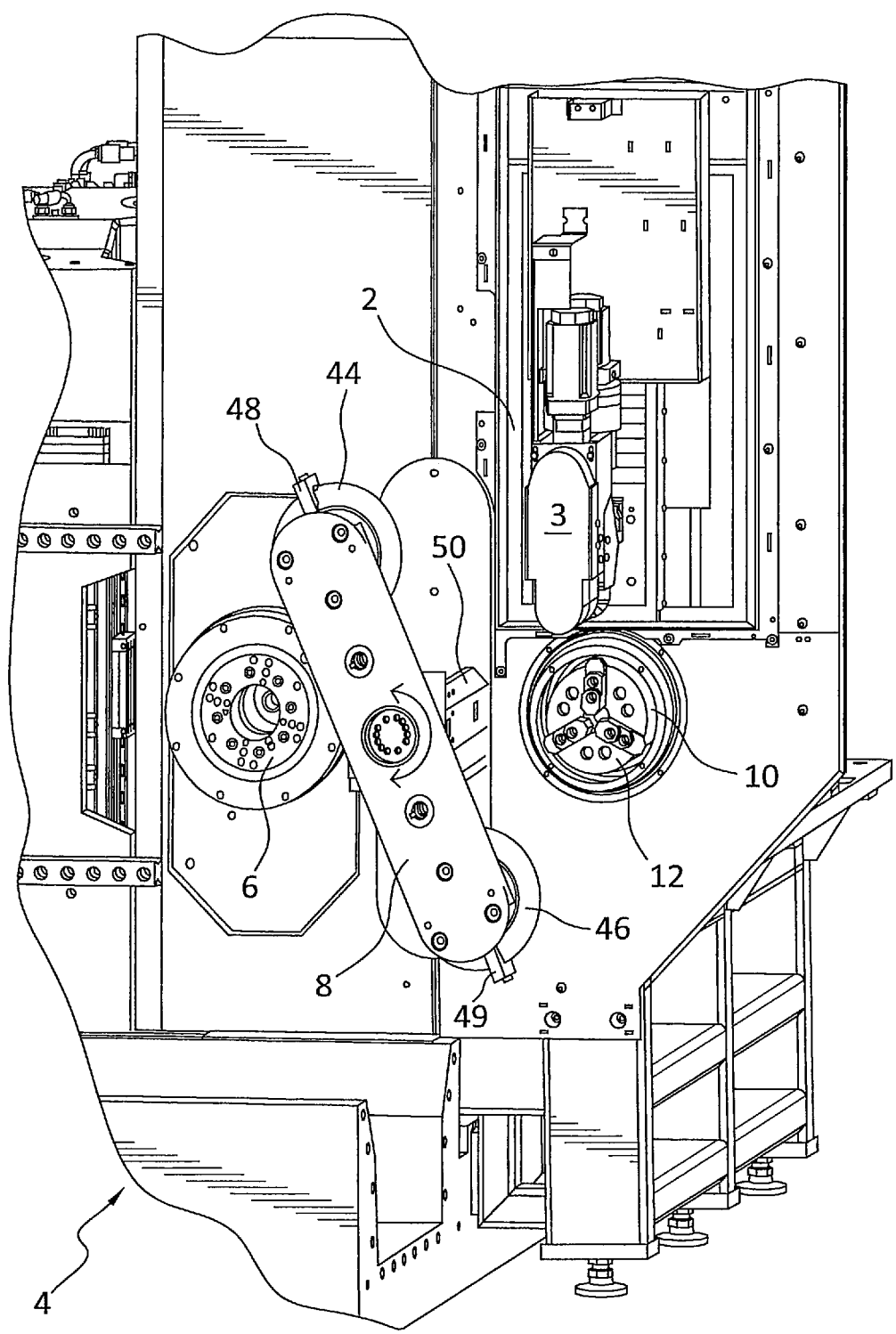
FIG. 2 shows a gear manufacturing machine with a transfer or loader arm in a working position.

FIG. 2 shows a transfer of workpieces wherein upon the completion of machining (e.g. cutting), the transfer arm 8 is actuated outwardly (i.e. away from the spindles 6, 10) from its rest position (shown in FIG. 1) and rotated to simultaneously grip a cut gear 44 on spindle 6 and a gear blank 46 on auxiliary spindle 10 via grippers 48, 49 (two or more at each end of transfer arm 8), withdraw both workpieces from their respective spindles and then rotate (about 180 degrees in the preferred embodiment) to bring the blank gear 46 to the work spindle 6 for cutting and the cut gear 44 to auxiliary spindle 10 for a subsequent operation (e.g. chamfering) or for temporary holding until removed manually or by an external mechanism (e.g. robot) for placement on a pallet or conveying means for example. Inward movement of the transfer arm 8 (i.e. toward the respective spindles) is then effected in order to load the gear blank 46 and cut gear 44 in their respective spindles. Once the workpieces are loaded, the transfer arm 8 returns to its rest position as shown in FIG. 1. After the subsequent operation (if any), cut gear 44 is removed from auxiliary spindle 10 and another workpiece blank is then loaded onto auxiliary spindle 10 where it waits until the next transfer cycle. Transfer arm 8 and grippers 48, 49 may be collectively referred to as a "loader" 9 (FIG. 3).

Figure 4:
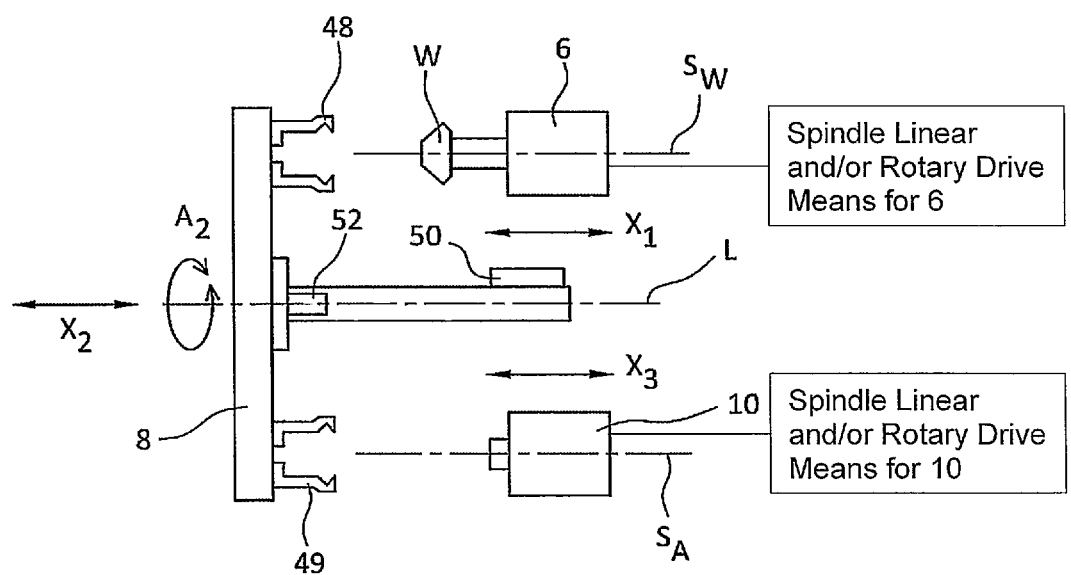
FIG. 4 is a schematic diagram of a closed-loop positioning axis for a loader mechanism along with a pair of spindles.

Transfer arm 8 is preferably driven by two servo motors 50, 52 that are each part of a closed-loop positioning axis which in the arrangement of FIG. 4 is axis L. A first servo motor 50 controls the linear outward and inward movements ($X_2$ direction) along the loader axis L as well as the extent of the linear movement which is dependent upon, among other things, the geometry of the workpiece since it can be understood that greater linear travel is necessary to provide adequate clearance for longer workpieces, such as bevel pinions with shafts, than for gears without shafts such as, for example, most designs of bevel ring gears. Examples of such servo motor driven linear motion systems include ball screws, rack and pinion mechanisms and belts drives.

Another servo motor 52 (see FIG. 4) controls the rotary (i.e. angular) motion of transfer arm 8 ($A_2$ direction) about loader axis L in order to exchange the workpieces between spindles 6, 10 and bring them into the proper alignment with respect to the spindles 6, 10. While closed-loop positioning axis servo motor drives 50, 52 are preferred, the movements of transfer arm 8 may be effected by other closed-loop positioning linear and rotational/angular driving means such as hydraulic or pneumatic means.

Figure 3:
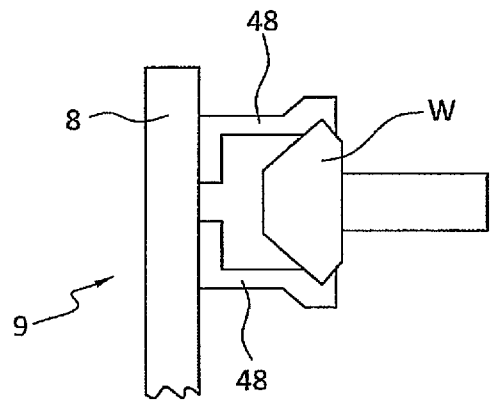
FIG. 3 is a schematic view of a gripper mechanism holding a bevel pinion with shaft.

As previously mentioned, gripper jaws, such as 48 of FIG. 3, have an amount of self-centering and aligning ability (linear and rotational) when they grip a workpiece. If the jaws grip on a ring gear or pinion blank that is not centered axially (linearly) and radially (rotationally), the jaws inherently create forces that try to center and align the part in the gripper. If the part is also chucked in a machine tool spindle, (spindle 6 of FIG. 6 for example), this may cause the servo motors 50, 52 of loader axis L to "fight" against servo motors (schematically shown in FIG. 4) associated with other machine axes, such as workpiece spindle axis Sw or auxiliary spindle axis SA (FIG. 5) for example, thereby creating a servo fault.

It has been discovered that by reducing the amount of electric current to the linear and/or rotary servo motors (e.g. 50, 52) of a closed-loop positioning system for an axis of a loader mechanism, which results in a reduction of output torque from each of the servo motors, the loader mechanism can be utilized in determining proper workpiece positioning in a machine tool such as a gear manufacturing machine, particularly a machine for manufacturing bevel and hypoid gears.

As an example, by reducing the amount of current to the servo motors 50, 52, resulting in reduced torque from each of the servo motors, the loader will effectively "float" and thereby react to forces created by the jaws gripping a ring gear or pinion blank by displacing itself into a position where such forces are neutralized. For example, reducing the current to 10-15% of the full (operating) current of each servo motor is usually sufficient to provide enough servo motor torque to enable movement of the loader in the $X_2$ and/or $A_2$ directions but is sufficiently low such that servo motors 50, 52 will not react and attempt to overcome certain forces acting on the loader, such as those forces encountered when the jaws attempt to center and align a ring gear or pinion blank that is already chucked in a machine tool spindle.

Once the loader is displaced to a position where the net forces are effectively zero, the $X_2$ and $A_2$ positions are recorded. Subsequent machining operations can then be carried out at full power with the loader performing loading and unloading tasks at the displaced positions resulting in proper centering and alignment of the workpiece along with the reduction of unwanted machine forces.

Figure 5:
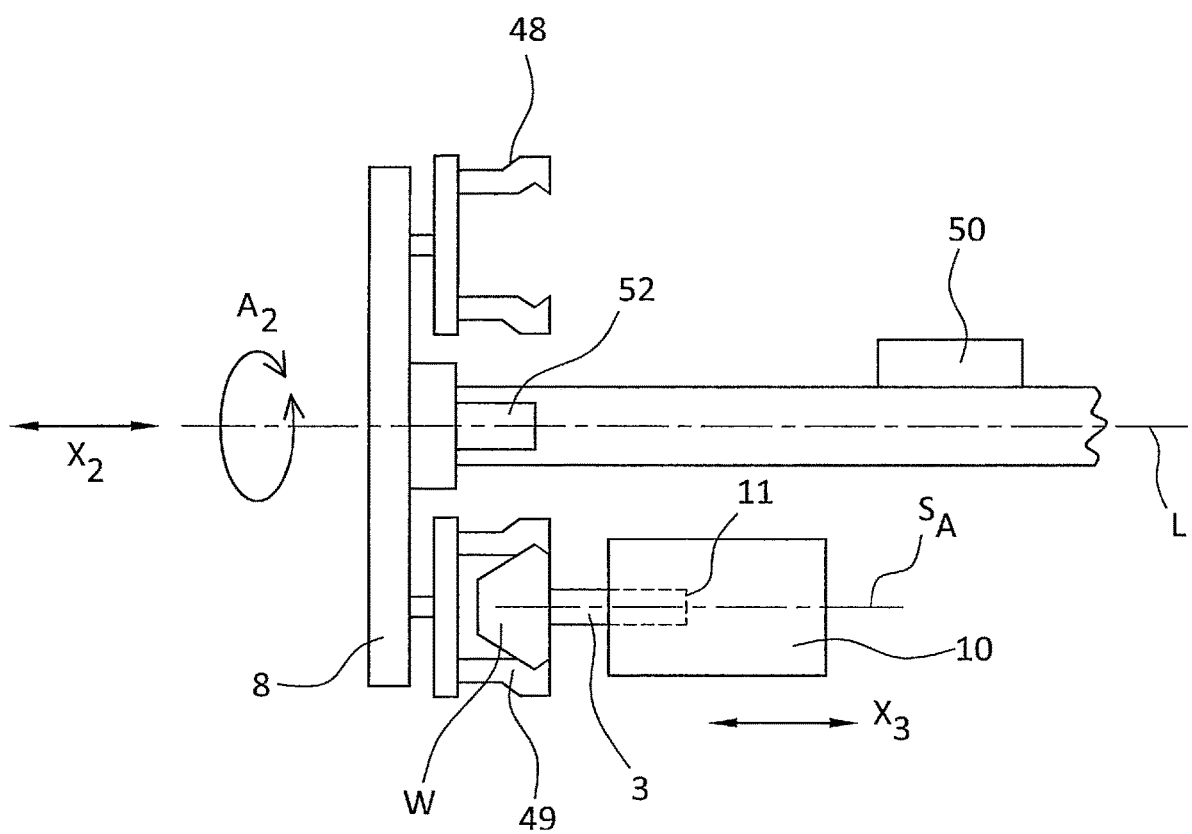
FIG. 5 is a schematic diagram of a closed-loop positioning axis for a loader mechanism as shown in FIG. 4 with one set of grippers holding a workpiece that is also positioned in a spindle.

In another example with reference to FIG. 5, a workpiece W in gripper 49 is moved toward spindle 10 such that the end of the shaft 3 of the workpiece W contacts the inner stop surface 11 of the workholding equipment, a chuck for example, (not shown) and stops due to the set low torque limit of servo motor 50. The workpiece W is then chucked. With the workpiece W secured in spindle 10 and the gripper 49 closed on the workpiece, axes L and SA (i.e. spindle 10 and the loader elements 8, 49) are mechanically tied or coupled together. Loader movement direction $X_2$ is preferably located in a horizontal plane and spindle directions of movement $X_1$ and $X_3$ are also preferably located in a horizontal plane.

Although axes L and SA are tied together, there is still some compliance due to the distance between the axes and the mechanical stiffness of the components between the axes such as the loader elements, namely the transfer arm 8, gripper 49 and their connections, as well as the driving means (e.g. ball screw) of the loader in the $X_2$ direction.

The workpiece is then pushed in a first direction (e.g. to the right in FIG. 5) by movement of the loader in the $X_2$ direction. Since the torque setting for the servo motor (not shown) for moving the spindle 10 in the $X_3$ direction is maintained at full torque, the spindle 10 will not move axially due to its higher torque limit. The loader moves in the $X_2$ direction until it reaches a position where the compliance and/or deflection of its coupling to spindle 10 (axis SA) creates a resistance equal and opposite in direction to the reduced torque limit established for servo motor 50, and then the loader cannot move further.

The workpiece is then pulled in the opposite direction (to the left in FIG. 5) by movement of the loader in the opposite $X_2$ direction to find the position where the compliance and/or deflection equals the set torque limit servo motor 50 in this opposite direction. As a result of this "push-pull" process, a position, preferably half way, between the right and left torque limit positions is selected as the $X_2$ position since this is the position where axes L and SA (i.e. the loader and spindle 10) have the minimum influence (axially) on one another.

A similar procedure may also be carried out for rotary direction $A_2$. Clockwise and counter-clockwise moves with a low torque limit set for servo motor 52 are utilized to locate the torque limit positions in each rotary direction. A position, preferably half way, between the opposite torque limit positions is selected as the $A_2$ position since this is the position where axes L and SA (i.e. the loader elements 8, 49 and spindle 10) have the minimum influence (rotationally) on one another.

The push-pull type process as described above may also be carried out with respect to spindle 6 (FIG. 6), the positions in the $X_2$ and $A_2$ directions where axes L and Sw (i.e. the loader elements 8, 48 and spindle 6) have the minimum influence (axially and rotationally) on one another can also be determined.

Figure 7:
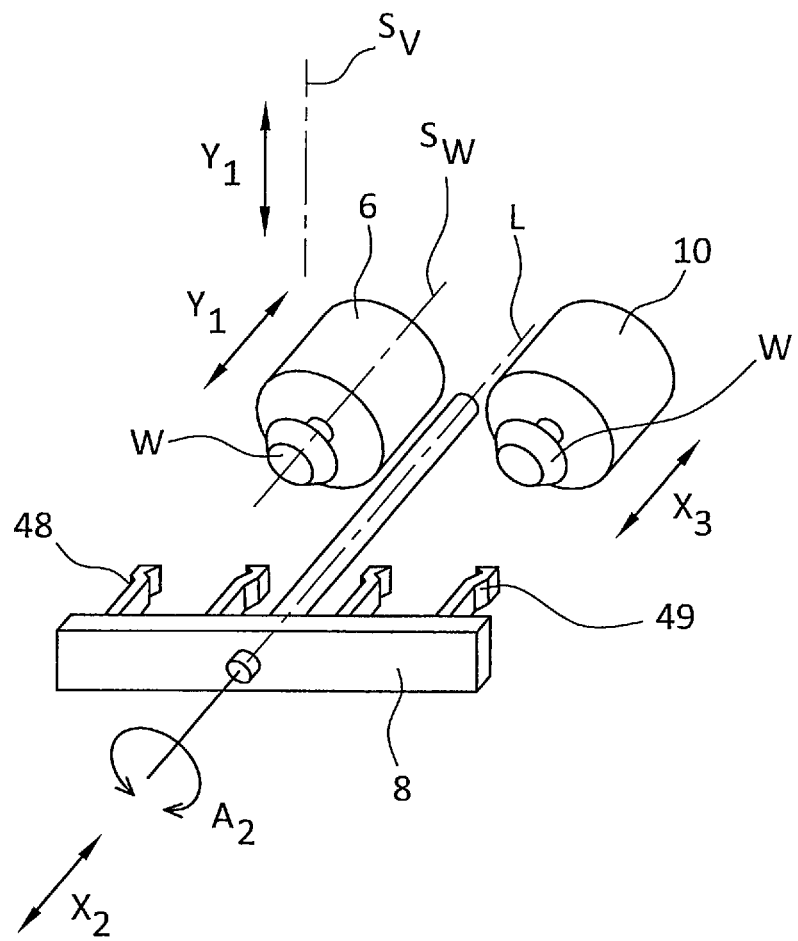
FIG. 7 is a schematic diagram of a closed-loop positioning axis for a loader mechanism of FIG. 4 with the inclusion of a vertical direction of motion for one of the spindles.

If additional directions of machine motion are present, such as vertical motion of spindle 6 in direction $Y_1$ along axis Sv as shown in FIG. 7, the inventive method is also applicable. The positions in the $X_2$ and $A_2$ directions where axes L and Sv (i.e. the loader elements 8, 48 and spindle 6) have the minimum influence (axially and rotationally) on one another may also be determined. Loader movement direction $X_2$ is preferably located in a horizontal plane and spindle direction of movement $Y_1$ is preferably located in a vertical plane.

If desired, positioning of a workpiece in a gripper be can determined, for example, by closing the arms of gripper 48 and moving the gripper in the $X_2$ direction toward a workpiece chucked in spindle 6 (see FIG. 4) until contact is made and the movement is stopped by the reduced torque limit established for servo motor 50. It is noted that the "closed" position of the arms of the gripper 48 is preferably such that sufficient distance exists between the arms of gripper 48 whereby the head of a pinion can be inserted therethrough and at least one arm of the gripper will contact the pinion at some location along the cone shaped face width portion of the pinion.

Figure 6:
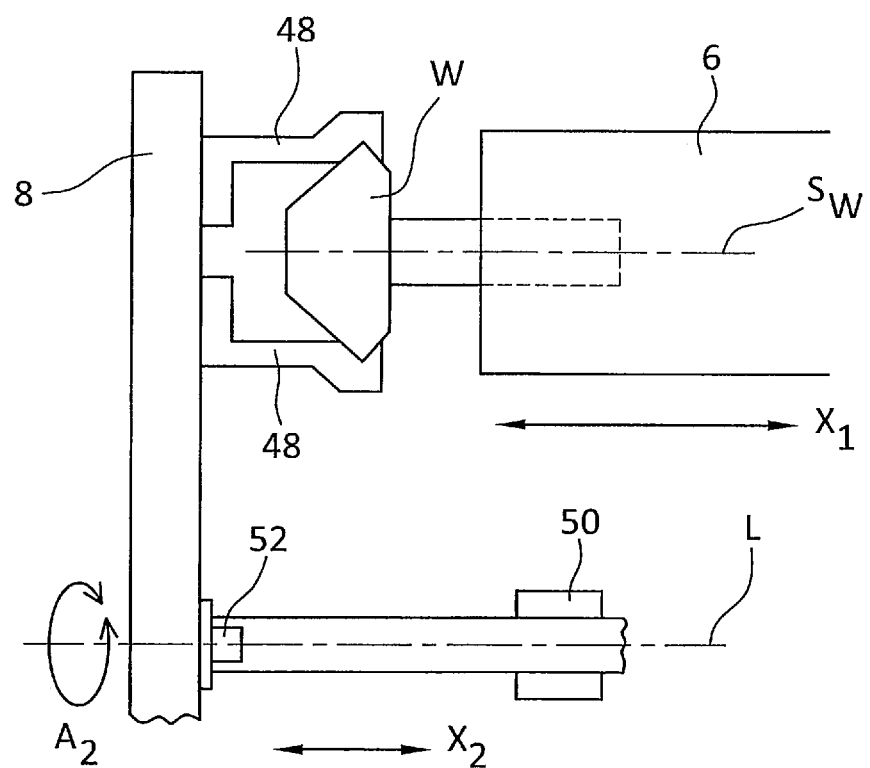
FIG. 6 is a schematic diagram of a closed-loop positioning axis for a loader mechanism as shown in FIG. 5 but with a different set of grippers holding a workpiece that is also positioned in a different spindle.

For example, the $X_2$ position of the loader is stored. The gripper 48 is moved in the opposite $X_2$ direction by a small distance (e.g. 2.0 mm) away from the workpiece while the vertical positioning of spindle 6 (FIG. 7) in the $Y_1$ direction is adjusted (e.g. moved down 0.1 mm) and the process is repeated multiple times (e.g. 10-20). The $X_2$ position furthest "in" (i.e. where the gripper arms are closest to the spindle 6) is where the workpiece is centered in the $Y_1$ direction (along the Sv axis). After the workpiece is positioned (centered) vertically ($Y_1$ position), the gripper 48 is then moved toward the workpiece until movement is stopped by contact with workpiece due to the low torque limit of servo motor 50. Gripper 48 is then opened and movement of gripper 48 in the $X_2$ direction continues by an amount sufficient to permit closing of the arms of gripper 48 to properly grip the workpiece (FIG. 6).

Subsequent to the above workpiece-gripper positioning process, a push-pull process, as described above, may be carried out. The invention contemplates the above-described processes as being usable singularly or sequentially. It should also be understood that the magnitude of current and/or reduced current need not be the same for all servo motors but may be provided at a first value for servo motor 50 and provided at a second and different value for servo motor 52, for example.

The invention may also be operable to provide a machine tool, having programmable computer control, with the ability to self-teach itself in order to determine the proper workpiece and/or loader positioning for loading and/or unloading workpieces from multiple spindles such as one or both of a machine spindle and an auxiliary spindle.

Although the invention has been described with reference to a loader mechanism located internally in a machine tool, the invention is also applicable to a loader mechanism located external to a machine tool.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method for determining workpiece positioning in a machine tool, said machine tool having a loader mechanism including a means for gripping a workpiece, said loader mechanism being linearly movable along a loader axis by a linear drive means and being angularly movable about said loader axis by a rotary drive means, said linear drive means and said rotary drive means being part of a closed-loop positioning system for said loader axis, said method comprising:
- applying a first amount of electric current to the loader linear drive means, said first amount being reduced in comparison to: (i) a defined full power amount of electric current for the loader linear drive means or (ii) a predetermined full power amount of electric current for the loader linear drive means, whereby as a result of the reduced first amount of electric current, the loader linear drive means provides a respective output torque that is reduced in comparison to: (i) a defined full power amount of torque for the loader linear drive means or (ii) a predetermined full power amount of torque for the loader linear drive means,
- applying a second amount of electric current to the loader rotary drive means, said second amount being reduced in comparison to: (i) a defined full power amount of electric current for the loader rotary drive means or (ii) a predetermined full power amount of electric current for the loader rotary drive means, whereby as a result of the reduced second amount of electric current, the loader rotary drive means provides a respective output torque that is reduced in comparison to: (i) a defined full power amount of torque for the loader rotary drive means or (ii) a predetermined full power amount of torque for the loader rotary drive means,
- positioning the workpiece in a machine spindle of the machine tool and gripping said workpiece with the means for gripping of said loader mechanism whereby said loader mechanism and said machine spindle are mechanically coupled together, said machine spindle being movable along and/or about one or more spindle axes of motion with each of said axes of motion being associated with a respective spindle drive means, wherein each of the spindle drive means outputs a respective torque at a respective defined full power amount or at a respective predetermined full power amount, wherein the reduced output torque of the loader linear drive means and the reduced output torque of the loader rotary drive means are less than the torque(s) at the full power amount(s) of each of the spindle drive means,
- wherein as a result of the reduced output torques of the loader linear drive means and of the loader rotary drive means of the loader mechanism with respect to the full power output torque of each of the spindle drive means, said loader mechanism is repositioned linearly in a direction along the loader axis and rotationally about the loader axis whereby machine forces arising from the mechanical coupling are neutralized.

2. The method of claim 1 wherein the loader mechanism repositioning comprises moving the loader mechanism relative to the spindle and linearly in a first direction, to a first linear position whereby the loader linear drive means creates a resistance equal and opposite in direction to the reduced output torque of the loader linear drive means, and
- wherein the loader mechanism repositioning comprises moving the loader mechanism relative to the spindle linearly in second direction opposite to the first direction to a second linear position whereby the loader linear drive means creates a resistance equal and opposite in direction to the reduced output torque of the loader linear drive means, and
- repositioning the loader mechanism at a final linear position between the first and second linear positions.

3. The method of claim 2 wherein the final linear position is half way between the first and second positions.

4. The method of claim 1 wherein the loader mechanism repositioning comprises moving the loader mechanism rotationally relative to the spindle in a first rotational direction to a first rotary position whereby the loader rotary drive means creates a resistance equal and opposite in direction to the reduced output torque of the loader rotary drive means, and
- wherein the loader mechanism repositioning comprises rotationally moving the loader mechanism relative to the spindle in a second rotational direction that is opposite to the first rotational direction to a second rotary position whereby the loader rotary drive means creates a resistance equal and opposite in direction to the reduced output torque of the loader rotary drive means, and
- repositioning the loader mechanism at a final rotary position between the first and second rotary positions.

5. The method of claim 4 wherein the final rotary position is half way between the first and second rotary positions.

6. The method of claim 1 wherein the loader mechanism is movable linearly in a horizontal plane and the spindle is movable linearly in a horizontal plane.

7. The method of claim 1 wherein the loader mechanism is movable linearly in a horizontal plane and the spindle is movable linearly in a vertical plane.

8. The method of claim 1 further comprising positioning a workpiece in the gripping means wherein the gripping means comprises at least a pair of jaws and the workpiece comprises a cone-shaped face width portion,
- closing the jaws,
- positioning the workpiece at a position along an axis having a direction perpendicular to the loader axis,
- moving the jaws toward the workpiece in a first direction of the loader axis until at least one of the jaws contacts the cone-shaped portion of the workpiece,
- recording the distance from the spindle to the point at which the at least one of the loader jaws contacts the cone-shaped portion of the workpiece,
- reversing the direction of jaw movement whereby the jaws are clear of the workpiece,
- adjusting the position of the workpiece in the direction perpendicular to the loader axis,
- repeating the steps of positioning, moving, recording, reversing and adjusting a plurality of times,
- selecting the workpiece position in the gripping means in accordance with the position of the workpiece in the direction perpendicular to the linear axis of the loader mechanism corresponding to the smallest recorded distance.

9. The method of claim 1 wherein said machine tool comprises a bevel gear manufacturing machine.

10. The method of claim 1 wherein said workpiece comprises a bevel pinion or a bevel ring gear.

11. A multi-axis gear manufacturing machine tool comprising a programmable computer control device wherein the computer control device is programmed so as to cause said gear manufacturing machine tool to carry out a method for determining positioning of at least one workpiece in the machine tool, said machine tool having a loader mechanism including a means for gripping the at least one workpiece, said loader mechanism being linearly movable along a loader axis by a linear drive means and being angularly movable about said loader axis by a rotary drive means, said linear drive means and said rotary drive means being part of a closed-loop positioning system for said loader axis, said method comprising:

applying a first amount of electric current to the loader linear drive means, said first amount being reduced in comparison to: (i) a defined full power amount of electric current for the loader linear drive means or (ii) a predetermined full power amount of electric current for the loader linear drive means, whereby as a result of the reduced first amount of electric current, the loader linear drive means provides a respective output torque that is reduced in comparison to: (i) a defined full power amount of torque for the loader linear drive means or (ii) a predetermined full power amount of torque for the loader linear drive means, applying a second amount of electric current to the loader rotary drive means, said second amount being reduced in comparison to: (i) a defined full power amount of electric current for the loader rotary drive means or (ii) a predetermined full power amount of electric current for the loader rotary drive means, whereby as a result of the reduced second amount of electric current, the loader rotary drive means provides a respective output torque that is reduced in comparison to: (i) a defined full power amount of torque for the loader rotary drive means or (ii) a predetermined full power amount of torque for the loader rotary drive means, positioning the at least one workpiece in a machine spindle of the machine tool and gripping said at least one workpiece with the means for gripping of said loader mechanism whereby said loader mechanism and said machine spindle are mechanically coupled together, said machine spindle being movable along and/or about one or more spindle axes of motion with each of said axes of motion being associated with a respective spindle drive means, wherein each of the spindle drive means outputs a respective torque at a respective defined full power amount or at a respective predetermined full power amount, wherein the reduced output torque of the loader linear drive means and the reduced output torque of the loader rotary drive means are less than the torque(s) at the full power amount(s) of each of the spindle drive means, wherein as a result of the reduced output torques of the loader linear drive means and of the loader rotary drive means of the loader mechanism with respect to the full power output torque of each of the spindle drive means, said loader mechanism is repositioned linearly in a direction along the loader axis and rotationally about the loader axis whereby machine forces arising from the mechanical coupling are neutralized.

\* \* \* \* \*